United States Patent [19]

Miyadera et al.

[11] Patent Number: 5,455,094
[45] Date of Patent: Oct. 3, 1995

[54] OPTICAL RECORDING MEDIUM

[75] Inventors: Toshiyuki Miyadera; Takashi Chuman; Takashi Yamada; Fumio Matsui, all of Saitama, Japan

[73] Assignee: Pioneer Electronic Corporation, Tokyo, Japan

[21] Appl. No.: 145,631

[22] Filed: Nov. 4, 1993

[30] Foreign Application Priority Data

Nov. 10, 1992 [JP] Japan .................................. 4-299394

[51] Int. Cl.⁶ ...................................... B32B 3/00
[52] U.S. Cl. ........................ 428/64.9; 428/457; 428/913; 430/270; 430/945; 346/135.1; 347/264
[58] Field of Search ............................... 428/64, 65, 457, 428/913; 430/270, 945; 346/76 L, 135.1

[56] References Cited

U.S. PATENT DOCUMENTS 5,075,147  12/1991  Usami et al. .............................. 428/64
5,080,946  1/1992   Takagisi et al. .......................... 428/64
5,161,150  11/1992  Namba et al. ............................. 428/64

Primary Examiner—Patrick J. Ryan
Assistant Examiner—Elizabeth Evans
Attorney, Agent, or Firm—Nikaido, Marmelstein, Murray & Oram

[57] ABSTRACT

An optical recording medium has a substrate having a groove, a recording film of phthalocyanine coloring matter and provided on the substrate, a light reflection film on the recording film, and a protection film on the light reflection film. The depth of the groove is between 800 Å and 1100 Å.

3 Claims, 1 Drawing Sheet

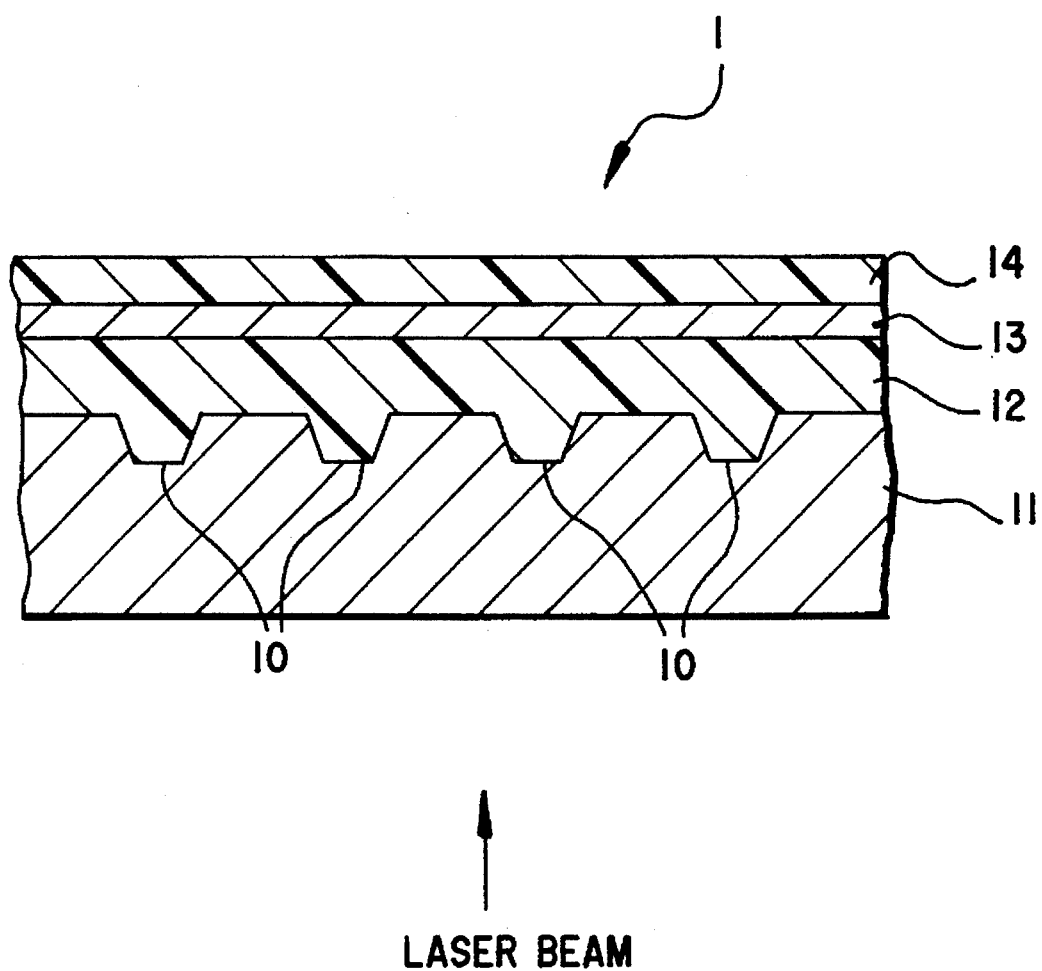
LASER BEAM

OPTICAL RECORDING MEDIUM

BACKGROUND OF THE INVENTION

The present invention relates to an optical recording medium such as a writable disc and readable disc, and more particularly to a recording medium which has a recording film containing coloring matter of phthalocyanine.

In a recording film of a rewritable optical recording medium, it is well known to use organic coloring matter such as cyanine or phthalocyanine.

As a method for writing information on the recording medium, a laser beam is focused on the recording film at a small area and converted into thermal energy so that the characteristic of the recording film is changed to form a pit. In order to properly change the characteristic of the recording film, two sheets of the recording mediums comprising a substrate and a recording film coated on the substrate is prepared. The recording films are disposed opposite to each other, interposing air therebetween, to produce a so called air sandwich construction.

A transparent substrate is irradiated with a laser beam for writing information and the pit is formed on the recording film. A laser beam for reading the recorded information has a rather weak power compared with the writing laser beam. The contrast between the pit and the area other than the pit is detected as an electric signal.

Besides the above mentioned recording medium, a recording medium on which information has been already recorded is provided. It is a read only memory (ROM) type recording medium which is widely used in the sound recording field and information processing field. In such a recording medium, it is not necessary to provide the writable recording film and prepits corresponding data to be reproduced are previously formed on a plastic substrate by press. A metallic reflection film made of Au, Ag, Cu, or Al is coated on the substrate and a protection film is covered on the reflection film. The most typical example thereof is a compact disc (CD). The format of writing and reading the signal of the CD is standardized and the reproducing device of the CD is widely used as a CD player.

Since the rewritable recording medium uses a laser beam and is in the form of a disc, it is the same as the CD. Therefore, it has developed to adapt the recording medium to be played by a CD player.

The recording medium comprises a light-transmissible substrate, a recording film made of organic coloring matter which is coated on the substrate, a light reflection film coated on the recording film, and a protection film covered on the reflection film.

The characteristics of the rewritable recording medium are standardized to standard values. Moreover, in order to preferably reproduce information recorded on the disc in the CD player, it is necessary to irradiate the disc with a sufficient power of a laser beam by a 3-beam method so as to obtain a tracking error signal.

In the recording medium having a cyanine recording film, the depth of a groove formed on the substrate is set to 1500 Å to 2000 Å. However, if the groove is formed in such a depth, it is rather difficult to transfer the shape of the groove of the master substrate to a substrate by injection molding.

When in use, the recording medium is reproduced by a CD player mounted on a car. Therefore, it is desirable that the recording medium has high resistances to light and environmental conditions. For such a use, it has been found that the phthalocyanine coloring matter is more effective for the recording film than the cyanine coloring matter.

In the recording medium having the recording film of phthalocyanine, if the depth of the groove is formed about 1500 Å to 2000 Å, the signal varies greatly after recording. Therefore, a stable efficiency which satisfies a standard can not be obtained.

SUMMARY OF THE INVENTION

An object of the present invention is to provide an optical recording medium where a groove of a substrate is formed in a predetermined range of such a depth as to be easily transferred such a injection molding of the substrate, and which may be properly reproduced by a CD player.

According to the present invention, there is provided an optical recording medium having a substrate having a groove, a recording film of phthalocyanine coloring matter and, provided on the substrate, a light reflection film on the recording film, and a protection film on the light reflection film, the depth of the groove being between 800 Å and 1100 Å.

The other objects and features of this invention will become understood from the following description with reference to the accompanying drawings.

BRIEF DESCRIPTION OF DRAWINGS

The single figure is an enlarged sectional view partly showing an optical recording medium according to the present invention.

DETAILED DESCRIPTION OF THE PREFERRED EMBODIMENT

Referring to the figure showing an optical recording medium of the present invention, in one embodiment of the present invention, a writable optical disc conformable to the format of the CD will be described. An optical recording medium 1 comprises a light-transmissible substrate 11 in the form of a disc, a recording film 12 coated on the substrate 11, a reflection film 13 coated on the recording film 12, and a protection film 14 covering the reflection film 13.

The substrate 11 is made of transparent material such as polycarbonate (PC) resin or polymethylmethacrylate (PMMA) resin and formed by injection molding in consideration of productivity.

Alternatively, the substrate may be formed by the photo-Polymer method. The thickness of the substrate 11 is about 1.0 to 1.5 mm.

A coaxial or spiral tracking groove 10 is formed on the substrate 11 at its underside.

The depth of the groove 10 is 800 Å to 1100 Å, preferably 800 Å to 1000 Å. If the depth is less than 800 Å, a radial contrast before recording (RCb) does not reach the standard value. If the depth exceeds 1100 Å, it is difficult to transfer the shape of the groove of the master substrate when the substrate is formed by injection molding. Furthermore, normalized push-pull ratio (NPPR), crosstalk, and jitter may satisfy their respective standards.

The recording film 12 coated on the substrate 11 contains organic coloring matter, for example, phthalocyanine coloring matter. The phthalocyanine coloring matter is represented by the general formula [1] as follows.

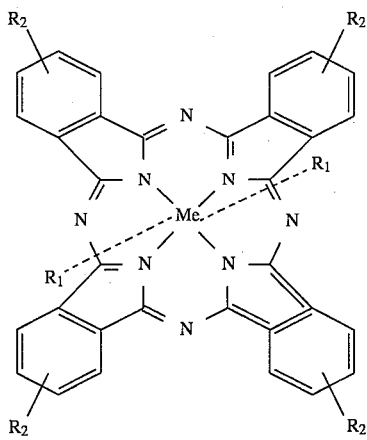

wherein $R_1$ is selected from alkyl group which may have a substituent, hydrogen atom, halogen atom, hydroxyl group, $-OR^{15}$, $-SR^{15}$, $-SeR^{15}$, $-TeR^{15}$,

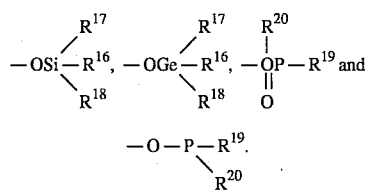

$R^{15}$ is selected from alkyl group which may have a substituent, aryl group which may have a substituent, cycloalkyl group which may have a substituent, and polyether group.

$R^{16}$, $R^{17}$, and $R^{18}$ may be either the same or the difference and are selected from alkyl group which may have a substituent, cycloalkyl group which may have a substituent, aryl group which may have a substituent, alkoxy group which may have a substituent, aryloxy group which may have a substituent, polyether group, hydroxyl group, and hydrogen atom.

$R^{19}$ and $R^{20}$ may be either the same or the difference and are selected from alkyl group which may have a substituent, cycloalkyl group which may have a substituent, and aryl group which may have a substituent.

$R_2$ is selected from alkyl group which may have a substituent independently, alkoxy group which may have a substituent, heterocyclic residue which may have a substituent, halogen atom, nitro group, cyano group, or sulfonic group.

Me is a metal. Particularly, Si, V, Fe or Al is preferable.

The recording film 12 containing such coloring matter is dissolved by a solvent and coated on the substrate 11 by a normal method such as spin coating so that the recording film 12 is formed. The thickness of the film is about 10 to 1000 nm, preferably 100 to 500 nm. If the thickness is less than 10 nm, the recording film lacks recording sensitivity. If the thickness exceeds 1000 nm, reflectance becomes insufficient.

The solvent is selected from such a material, for example, deacetone alcohol, ethyl cellosolve, methyl cellosolve, isophorone, methanol, or tetrafluoropropanol.

The reflection film 13 coated on the recording film 12 is made of metal such as Au, Al, Ag or Cu and coated by vacuum deposition, cathode sputtering, or ion plating. The thickness of the film 13 about 0.02 to 2.0 μm.

As the protection film 14 for protecting films 12 and 13, a resin hardened by ultraviolet ray is used and covered by spin coating. Alternatively, epoxy resin, acrylic resin, silicon or urethane resin is used. The thickness of the film 14 is determined for preventing the reflection film 13 from deteriorating when the pits are formed on the recording film 12. Namely, the reflection film 13 may deform toward the protection film 14 when pits are formed on the film 12. If such a deformation exists, it is impossible to normally reproduce the signal.

Therefore, the thickness of the protection film 14 is more than 2.5 μm, preferably more than 3.0 μm. However, if the film 14 is made of the resin of a type hardened by the ultraviolet ray, the thickness is preferably less than 50 μm. If the thickness is excessively large, the film is not effectively hardened by the ultraviolet ray.

A top coat film made of organic material may be provided on the substrate 11 opposite to the recording film 12 for adjusting reflectance. An interlayer such as a protection film for protecting the substrate 11 from solvent may be provided between the substrate 11 and the recording film 12.

In operation, the disc is rotated and the irradiated with a laser beam in the form of pulses. A part of the recording film is melted and removed so that pits are formed. The pits are irradiated with the laser beam at the reproduction of the disc and read by detecting the difference between the injected light and the reflected light.

The present invention will be described in detail with reference to an example.

EXAMPLE

The substrate 11 which is made of polycarbonate having 12 cm in diameter and 1.2 mm in thickness is formed by injection molding. The groove 10 is formed on the substrate 11 at 700 Å in depth.

Phthalocyanine coloring matter specified by the following formula is melted in the solvent of ethyl cellosolve to make a solution for the recording film. The solution is coated on the substrate 11 by spin coating to the thickness about 1800 Å so that the recording film 12 is formed.

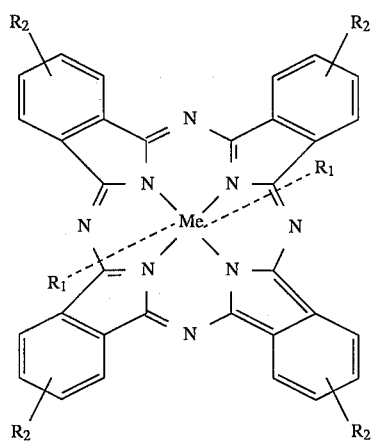

Me:Si $R_1$:

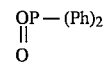

Ph=benzene ring $R_2$:$OCH_2CF_2CF_2H$ (substitution position: 3 or 6 position)

The reflection film 13 made of Au is coated at the thickness 1000 Å by vacuum deposition of resistor heating type. The protection film 14 made of ultraviolet ray hardening acrylate resin is covered at the thickness about 5 μm.

Test

In the example, an EFM signal is recorded under recording conditions as follows.

L.V.=1.4 m/s, λ=785 nm, N.A.=0.5, and recording power of the laser beam=8.0 mW.

Thereafter, the signal is reproduced under reproducing conditions as follows.

L.V.=1.4 m/s, λ=783 nm, N.A.=0.45, and reproducing power of the laser beam=0.3 mW.

Each item standardized for the CD-R is estimated.

The following table shows the results of the test. The results are represented as follows.

○:satisfy the CD-R standard
X:not satisfy the CD-R standard

| | | TEST | | | |
|---|---|---|---|---|---|
| | | EXAMPLE 1 | EXAMPLE 2 | EXAMPLE 3 | EXAMPLE 4 |
| | | | DEPTH (Å) | | |
| ITEM | ABBR | 700 | 800 | 1100 | 1200 |
| RADIAL CONTRAST (BEFORE RECORDING) 2(IIb − Igb)/(IIb + Igb) | $RC_b$ | X | ○ | ○ | ○ |
| $R_{top}$ | | 62%R | 60%R | 58%R | 56%R |
| NORMAILIZED PUSH-PULL RATIO (TEb/Igb)/(TEa/Iga) | NPPR | ○ | ○ | ○ | X |
| CROSSTALK | | ○ | ○ | ○ | X |
| JITTER (PIT) | | ○ | ○ | ○ | X |
| JITTER (LAND) | | ○ | ○ | ○ | X |
| BLOCK ERROR RATE | BLER | ○ | ○ | ○ | ○ |
| RECORD SIGNAL $I_{11}$ MODULATION $I_{11}/I_{top}$ | | ○ | ○ | ○ | ○ |
| RECORD SIGNAL $I_3$ MODULATION $I_3/I_{top}$ | | ○ | ○ | ○ | ○ |
| TE MODULATION (AFTER RECORDING) $TE_a/I_{top}$ | | ○ | ○ | ○ | ○ |
| WOBBLED SIGNAL MODULATION $WS/TE_b$ | $I_w$ | ○ | ○ | ○ | ○ |
| RADIAL CONTRAST (AFTER RECORDING) 2(IIa − Iga)/(IIa + Iga) | $RC_a$ | ○ | ○ | ○ | ○ |

Examples 2 to 4

The depth is changed to 800 Å, 1100 Å and 1200 Å. Other conditions of the recording medium are the same as the first example.

From the foregoing, it will be seen that if the depth of the groove is 800 Å to 1100 Å in the examples 2 and 3, each item approximately satisfies the standard. If the depth is 700 Å in the example 1, the value RCb is marked X which does not satisfy the standard. If the depth is 1200 Å in the example 4, NPPR, crosstalk and jitters are marked X which do not satisfy the standards.

In accordance with the present invention, the depth of the groove on the substrate is formed at 800 Å to 1100 Å. Therefore, the groove is easily transferred at forming the substrate by injection molding. The recording medium has a stable efficiency which satisfies the standard of the CD-R and the resistance to the environmental condition is improved.

While the presently preferred embodiment of the present invention has been shown and described, it is to be understood that this disclosure is for the purpose of illustration and that various changes and modifications may be made without departing from the scope of the invention as set forth in the appended claims.

What is claimed is:

1. In an optical recording medium comprising a substrate having a grooved surface, a recording film of comprising phthalocyanine coloring matter provided on the grooved surface of the substrate, a light reflection film on the recording film, and a protection film on the light reflection film, the improvement which comprises:

said phthalocyanine coloring matter being represented by a following general formula

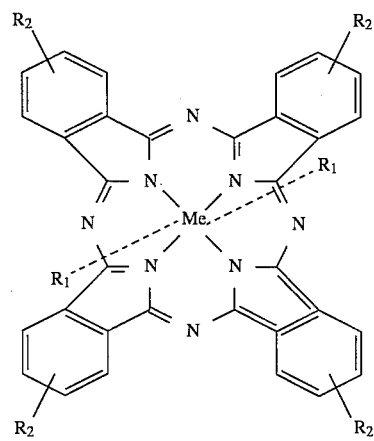

wherein:
R, is am least one member selected from the group consisting of alkyl, hydrogen, hologen, hydroxyl —$OR^{15}$, —$SR^{15}$, —$TeR^{15}$,

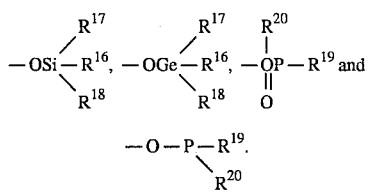

$R^{15}$ is selected from alkyl, substituted alkyl, aryl, substituted aryl, cycloalkyl, substituted cycloalkyl, and polyether, $R^{16}$, $R^{17}$, and $R^{18}$ are each independently selected from the group consisting of alkyl, substituted alkyl, cycloalkyl, substituted cycloalkyl, aryl, substituted aryl, alkoxy, substituted alkoxy, polyether aryloxy, hydroxy, and hydrogen.

$R^{19}$ and $R^{20}$ are each independently selected from the group consisting of alkyl, substituted alkyl, cycloalkyl, substituted cycloalkyl, aryl, and substituted aryl, $R_2$ is at least one member of the group consisting of alkoxy, substituted alkoxy, a residue of a heteroxyclic compound, a residue of a substituted heteroxyclic compound, halogen, nitro, cyano and sulfonic, and Me is a metal; and said groves having a depth of 800 Å and 1100 Å.

2. The recording medium according to claim 1 wherein: the depth is between 800 Å and 1000 Å.

3. The improved optical recording medium as claimed in claim 1 wherein said Me constituent is selected from the group consisting of silicon, vanadium, iron, and aluminum.

* * * * *